UNITED STATES PATENT OFFICE.

WILLIAM J. RAND, JR., OF BROOKLYN, E. D., NEW YORK.

IMPROVEMENT IN ARTICLES FOR FOOD FROM ALGÆ OR SEA-MOSSES.

Specification forming part of Letters Patent No. 113,562, dated April 11, 1871.

Be it known that I, WILLIAM J. RAND, Jr., of the Eastern District of Brooklyn, county of Kings, and State of New York, have invented a new and useful Mode of Preparing Articles of Food from Algæ, commonly called sea-mosses or marine plants, growing at or near the ocean and other waters, either salt or fresh, of which the following is a specification:

Patents, dated August 10, 1869, were granted by the United States to William J. Rand for the manufacture of articles of food, and the mode of packing it for the convenience of the consumer and the trade, from one species of algæ called *Chondrus crispus*, carrageen, or Irish moss, in connection with Iceland moss—a lichen or land-moss.

There are known to be over two thousand distinct species of algæ, and among them many contain the most valuable elements of vegetable nutrition. Some writers affirm that they contain nutritive elements sufficient to sustain all the demands of the human system.

Among those mentioned is a species called *Rhodymenia palmata*; another, *Durvillæa utilis*; another, *Plocaria lichenoides*; and others as follows: *Rhodosperous, Gigartina gracilaria, Gracilaria spinosa*, more commonly called *Ogar-ogar, Gigartina speciosa*, Ceylon moss, or *Placaria lichenoides*, and others too numerous to mention.

None of these have been brought before the public as a manufactured, convenient, and commercial article, save the exception alluded to under patents granted to William J. Rand.

A proper introduction of all other species of algæ as articles of food, prepared for the convenience of the consumer and the trade, is conceived to be of immense importance in a country where the constant increase of the population renders it desirable that every effort should be made to increase that supply.

Hon. William H. Harvey, professor of botany in the Royal College in Dublin, says "that algæ have been neglected as an article of food from want of proper commercial form, ignorance, and its invariable companion, prejudice."

The only serious objection to algæ as an article of food is its peculiar flavor. Growing, as they do, mostly in salt-water, they contain lime, sulphur, salt, iodine, &c., which impart what may be properly called a "sea flavor."

The object of this invention, then, is to expel, by a suitable process, the objectionable ingredients without decomposing or changing the nutritious and health-giving qualities, and put in such form as will be the cheapest and most convenient for commerce and the consumer.

My invention, therefore, consists of preparing algæ as a new and convenient commercial article, in the following manner:

My first mode of preparing algæ (with the exception alluded to, *Chondrus crispus*) is to thoroughly clean the moss by suitable machinery or by hand, as may be deemed the most economical and effectual, not breaking or disintegrating it any more than is necessary in the process of cleaning, and by washing it in a light alkali to remove the salt and disagreeable sea taste, and after desiccation to disintegrate or grind it to a fine powder or farine, and put it up in suitable boxes or packets suitable for the convenience of the consumer and the trade.

My second mode is to mix the powder or farine with other articles of food, such as sugar, corn-starch, rice-flour, and put up in suitable boxes or packets, &c.; but I prefer it without the admixture of any other article.

My third process is to wash the algæ in a light alkaline water to free it from salt and the disagreeable sea flavor and other impurities, and after desiccation in a suitable hot-air chamber or drying-room to put the algæ, without any disintegration, (save what is actually necessary or unavoidable in the process of cleaning either by suitable machinery or by hand,) into small cloth bags, or an equivalent, so that when in the course of preparation for culinary purposes the bag, or its equivalent, may act as a strainer, imparting to the milk or the liquid in which it is being dissolved the more delicate portions of its flavor and nutriment, and retaining in the bag the horny and hard stems which contain the coarser and most undesirable parts.

Blanc mange made in this manner is far more delicate and nutritious than when made from the powder or farine.

My fourth mode is to mix with the moss in the bags, or the equivalents, suitable spices or flavor, such as vanilla-bean, whole cloves, cassia, allspice, nutmeg, &c., that the aroma may be imparted when in process of cooking; but I prefer flavoring with extracts of any flavor when the process of cooking has been finished just previous to placing it into suitable forms or molds.

I do not claim *Chondrus crispus* made into a powder or in any manner disintegrated, save what is unavoidable in the process of cleaning; nor do I claim it put up in its natural state in suitable boxes or packets without disintegration, as such claims have been before allowed to William J. Rand; but What I do claim, and desire to secure by Letters Patent, is—

1. *Chondrus crispus*, or Irish moss, and other species of algæ, as specified, washed in a light alkaline water, desiccated, and put up in cloth or other bags, or an equivalent, suitable in size for the convenience of the consumer and the trade, as set forth.

2. The new manufacture algæ, of the several species herein described, ground, powdered, cut up, shredded, or disintegrated, with or without the addition of other substances, so as to be put up and form an article of food, as set forth.

3. The above-described process for treating algæ, substantially as and for the purpose set forth.

WILLIAM J. RAND, Jr.

Witnesses:
RICHARD W. UNDERHILL,
C. H. JONES.